United States Patent Office 2,898,473
Patented Aug. 4, 1959

2,898,473

METHOD OF PREPARING POLONIUM-BORON SOURCES

John H. Birden, Dayton, Ohio, assignor to the United States of America as represented by the United States Atomic Energy Commission No Drawing. Application July 31, 1956
Serial No. 601,324

1 Claim. (Cl. 250—84.5)

The present invention relates to methods for preparing neutron sources, and more especially to novel methods for preparing neutron sources from polonium-210 and boron for use in well-logging, reactor start-up, experimental purposes, and the like.

Neutron sources have been prepared heretofore from polonium and beryllium or boron by inserting both of the selected materials into a metal container, sealing the container, and heating the container comparatively slowly to a desired elevated temperature, after which the heating is removed and the source allowed to cool naturally. Such methods are described in my co-pending application S.N. 542,117, filed October 21, 1955, now Patent No. 2,883,553, dated April 21, 1959. While useful, high intensity sources may be fabricated in this manner, I have found that when boron is used as the neutron emitting substance, and the heating cycle is continued for several hours, the source unaccountably loses much of its strength. While such prior sources are generally useful, since they retain from 35 to 50% of the neutron efficiency which they originally reach, it is highly desirable that this maximum neutron efficiency be retained. It is apparent that if some method were to be found for doubling the neutron efficiency, only one-half the relatively expensive source material would have to be used to fabricate a source of a given intensity.

Accordingly, it is the primary object of my invention to provide a neutron source characterized by relatively high neutron efficiency. It is a further object of my invention to provide a polonium-boron neutron source capable of retaining the maximum flux level which it reaches during the fabrication process. A further object of my invention is to provide an improved neutron source wherein the neutron flux provided is substantially double that available from sources fabricated according to prior methods.

In accordance with my invention I have postulated that the metal container used for the sources has a higher heat conductivity than the boron so that when the source is cooled a substantial temperature gradient is established therewithin. The boron, being inside the source, is not cooled by the ambient external conditions, and reaches a temperature above the volatilization temperature of polonium, so that the polonium transfers back from the boron to the cooler surface of the metal container, where it condenses. I have found that by extremely rapid heating of the container to a temperature at which the polonium becomes volatile, then rapid cooling of the source as soon as possible after the neutron flux begins to level off and decrease, before the boron reaches the melting point of polonium, substantially 250° C., I can reverse the temperature gradient within the source and prevent the polonium from leaving the boron surface. To obtain high neutron efficiencies, the boron should be covered with as thin a layer of polonium as possible. This minimizes self absorption, which is a loss of alpha energy due to traveling through the polonium deposit itself. Since the boron is hard and refractory the polonium condenses in a film on the boron particles. If the boron is allowed to become hot enough to melt the polonium, the polonium will form globules which would greatly increase the self absorption and thus reduce the neutron efficiency.

The preferred neutron source container is fabricated from materials which do not readily unite with the polonium and which can be rapidly raised in temperature in a furnace or by induction heating. The walls of the containers are preferably made thin to reduce the heat capacity. I have generally used wrought iron and cold-rolled steel containers with walls from 0.01" to 0.1" in thickness. Any suitable material meeting the above qualifications and structurally strong may be used, in which case the dimensions will depend upon the heat capacity and thermal conductivity of the metal selected.

Polonium is preferably introduced into the container by volatilizing it from a source of polonium which is heated while the container wall is kept cool. This operation may be done, for example, in an evacuated glass vessel, or the source may be simply placed in confronting relationship with the open container and heated to drive the polonium from the source onto the container walls. After the polonium is transferred to the container walls, the boron powder is added in selected quantity. The size of the container and the amounts of polonium and boron will depend, of course, upon the desired neutron flux level of the source. The container is then sealed by applying a coating of nickel or other suitable sealing material to the outer surface. Suitable sealing is accomplished by placing the container in an atmosphere of nickel carbonyl and heating it by induction to decompose the nickel thereon. A nickel coating of 0.02 inch has proved suitable, although there is nothing critical in the coating thickness. The containers coated may be of any desired shape, such as cup-shaped hollow cylinders, having a plug for the open end, for example.

The sealed container is next heated in a furnace provided with means to control the temperature, means to continuously measure and record the temperature, and means to continuously measure and record the neutron flux emitted by the source. The container may also be heated by induction or other means suitable to preferentially elevate the temperature of the container walls relative to that of the powder. Heating is generally done in an inert atmosphere or a vacuum to prevent oxidation of the container. The container is heated very rapidly to a temperature sufficient to cause volatilization of the polonium off the container walls and to distribute it on the boron powder, that is to temperatures between substantially 600 and 700° centigrade. The neutron flux as measured and indicated will continuously rise during the heating process, which should be done as rapidly as is possible. In the preferred mode of operation, a curve of temperature plotted against time shows the temperature rising substantially vertically, indicating the very rapid heating of the container walls. At a temperature above about 600° C. the heating is discontinued and the source is quenched or cooled very rapidly to prevent the boron in the interior of the source from reaching the melting point of polonium. The almost vertical rise and very rapid fall of the temperature curve produces a "spike" about twelve seconds wide on a temperature chart recorder, from which the novel method has been termed "spike heating." If the strength of the source is not at the desired level, a plurality of short heating cycles are employed to successively raise the strength to the desired point.

In preparing sources by my novel method, timing of the end of the heating cycle and beginning of the cooling cycle is vitally important in achieving the maximum neutron efficiency per source. The simplest method of control is for an operator or an instrument to monitor the container temperature, and to cool the source immediately after the volatilization temperature is reached. A preferred method of control of the timing cycle is to automatically record the neutron flux by a counter disposed near the source and an associated amplifier and recorder. When the neutron flux reaches a selected level, or when it reaches a peak below that level, as indicated by flattening out of the sharply-rising recorded curve of neutron flux vs. time, the source is quickly cooled as rapidly as possible. Cooling may be done in a refrigerated water bath, or in any other suitable system for quickly removing heat from the source. For example, the sources have been heated in an atmosphere of helium at a pressure of substantially 10 cm. Hg° and cooled by admitting helium to a pressure of 70 cm. of Hg°, pumping out and admitting fresh helium as needed. Sources have been heated in a vacuum and cooled by admitting helium to a pressure of 70 cm. Hg°, repeating as needed.

The heating and cooling cycles may be done by an operator watching the flux indicator or watching the temperature indicator, or it may be done automatically. For example, a switch may be provided to open a circuit responsive to a selected flux level measured on the recorder to drop the source into a quenching bath; or the switch may be actuated by a conventional rate circuit, which measures the rate of change of flux and provides an actuating minimal signal when the rate of increase falls off to a selected rate; or the switch may be moved by a backward movement of the recorder pen, indicating a falling flux level. Other suitable variations of the above automatic operating means will occur to those skilled in the art.

To illustrate in more detail preparation of neutron sources according to my novel method and the improvements resulting therefrom, preparation of several sources is described below in detail.

*Example 1.*—The source container chosen was cold-rolled steel formed in a cylinder 0.66 inch in diameter and 0.66 inch high having inside dimensions 0.5" in diameter and 0.5" high. Polonium-210 was volatilized into the source container from one end by heating the polonium, and deposited upon the steel walls. Substantially 1.8 grams of boron powder, 230–325 mesh, U.S. Standard sieve, was used. The container was closed and sealed at a pressure of about 3 centimeters mercury by heating in nickel carbonyl vapor. Nickel was applied until the external dimensions reached .7" in diameter and height. The measured neutron flux was $4.45 \times 10^5$ neutrons per second, about 38.6% neutron efficiency.

The source was placed in a vacuum system in a helium atmosphere at 10 centimeters mercury. The source was heated very rapidly by induction and the neutron flux was monitored. When the neutron flux curve began to level off, the source was cooled as rapidly as possible to prevent transfer of the polonium off the boron. The neutron flux was measured as $9.98 \times 10^5$ neutrons per second, giving a neutron efficiency of 86.4%.

*Example 2.*—Polonium was volatilized into the container as in Example 1. The container was made of Ledloy, a cold-rolled steel having 0.35% of lead added for machining purposes. The inside dimensions were 0.5" in diameter and height, while the outside dimensions were 0.58" in diameter and height. The source was sealed with a continuous layer of nickel of 0.02" thick. The neutron flux measured was $1.34 \times 10^6$ neutrons per second, giving an efficiency of 44.7%. The source was rapidly heated to above the volatilization temperature of polonium and rapidly cooled when the neutron flux curve began to level off, as in Example 1. The neutron flux was increased to $2.79 \times 10^6$ neutrons per second, giving a neutron efficiency of 99.4%.

*Example 3.*—A source was made in identical manner with that of Example 2 except that the container was made of wrought iron. The same amounts of polonium and boron were used. After the spike heating was accomplished, the neutron flux of $2.88 \times 10^6$ neutrons per second was achieved, giving the neutron efficiency of 98%.

It will be apparent to those skilled in the art that I have devised an important improvement in the manufacturer of neutron sources from polonium and boron. By preparation of sources according to my novel method, the neutron flux achieved can be substantially double for any given quantities of the source materials. When prepared by my novel method, sources are characterized by neutron efficiencies of 85–99%, as compared with 40–45% in sources prepared according to prior methods.

Having described the invention, what is claimed as novel is:

The method for preparing a source of neutrons comprising the steps of volatilizing into a thin metal container a selected quantity of polonium-210, adding to said container a selected quantity of boron powder, applying a nickel coating to said container to seal said polonium therein, measuring and recording a curve of the neutron flux emitted by said source, preferentially heating by induction said container to a temperature greater than the volatilization temperature of said polonium, terminating said heating step when said neutron flux curve begins to level off, and immediately quenching said source so that the temperature of said boron powder remains below said melting point of polonium to prevent retransfer of the polonium from said boron to said container.

References Cited in the file of this patent

UNITED STATES PATENTS

| | | |
|---|---|---|
| 2,440,999 | Anderson | May 4, 1948 |
| 2,592,115 | Carroll | Apr. 8, 1952 |

OTHER REFERENCES

Graves et al.: "Miscellaneous Phyhical and Chemical Techniques of the Los Alamos Project" (National Nuclear Energy Series V-3), McGraw-Hill Book Co., Inc., N.Y., 1952, pp. 54, 55.

TID-5087, U.S. Atomic Energy Commission, July 1952, declass. November 29, 1955, pp. 7–9.

The Reactor Handbook, vol. 1, AECD-3645, Atomic Energy Commission. Declassized edition, February 1955, pp. 3, 4, 5.